United States Patent
Szedo et al.

(10) Patent No.: US 7,684,968 B1
(45) Date of Patent: Mar. 23, 2010

(54) GENERATION OF A HIGH-LEVEL SIMULATION MODEL OF AN ELECTRONIC SYSTEM BY COMBINING AN HDL CONTROL FUNCTION TRANSLATED TO A HIGH-LEVEL LANGUAGE AND A SEPARATE HIGH-LEVEL DATA PATH FUNCTION

(75) Inventors: Gabor Szedo, San Jose, CA (US); Singh Vinay Jitendra, Fremont, CA (US); L. James Hwang, Menlo Park, CA (US)

(73) Assignee: Xilinx, Inc., San Jose, CA (US)

( * ) Notice: Subject to any disclaimer, the term of this patent is extended or adjusted under 35 U.S.C. 154(b) by 793 days.

(21) Appl. No.: 11/010,027

(22) Filed: Dec. 9, 2004

(51) Int. Cl.
*G06F 17/50* (2006.01)

(52) U.S. Cl. .................... 703/14; 716/3; 716/18

(58) Field of Classification Search .......... 703/14; 717/104, 137; 716/3, 18
See application file for complete search history.

(56) References Cited

U.S. PATENT DOCUMENTS

| | | | |
|---|---|---|---|
| 6,237,132 B1 * | 5/2001 | Dean et al. | 716/18 |
| 6,606,588 B1 * | 8/2003 | Schaumont et al. | 703/15 |
| 2003/0154465 A1 * | 8/2003 | Bollano et al. | 717/137 |

* cited by examiner

*Primary Examiner*—David R Vincent
*Assistant Examiner*—Ben M Rifkin
(74) *Attorney, Agent, or Firm*—LeRoy D. Maunu

(57) ABSTRACT

Generating a high-level, bit-accurate and cycle-accurate simulation model. The various embodiments generate the simulation model from a functional description of a module and an HDL description of the module. The functional description may be un-timed and specified in a high-level language. The HDL description is realizable in hardware. The simulation model is created by obtaining the control specification from the HDL description and combining the control specification with the data path description from functional description.

14 Claims, 4 Drawing Sheets

GENERATION OF A HIGH-LEVEL SIMULATION MODEL OF AN ELECTRONIC SYSTEM BY COMBINING AN HDL CONTROL FUNCTION TRANSLATED TO A HIGH-LEVEL LANGUAGE AND A SEPARATE HIGH-LEVEL DATA PATH FUNCTION

FIELD OF THE INVENTION

The present invention generally relates to generating a simulation model of an electronic system.

BACKGROUND

Various design tools seek to simplify the tasks associated with designing an electronic system. For example, the System Generator high-level modeling system (HLMS) from Xilinx includes various tools that allow a user to assemble a design model using high-level functional blocks, simulate the design, and generate a realization of the design for a hardware platform such as a programmable logic device (PLD). The blocks used in creating the design may be selected from a library that is also part of the HLMS. An HLMS such as System Generator can substantially shorten the time required to develop a design by allowing a user to describe the system at an abstract level, while preserving functional behavior, and automatically generating the implementation. Traditional methodologies instead require specifying the functionality of the design in a hardware description language (HDL).

To fully support simulation and realization of a design, each block in an HLMS library typically consists of a component that is purely behavioral (bit- and cycle-accurate) that is used for simulation within the HLMS, and an equivalent component that can be automatically mapped into a realization (e.g., in a PLD) by conventional methods during code generation. Such methods include logic synthesis or direct mapping (a one-to-one mapping of logic components into resources in the target technology library). In the latter case, the implementation is referred to as structural. Although it is possible for a block in an HLMS to have a single component that supports both simulation and implementation, it is often the case that a separate simulation model is necessary because the implementation involves significant structural code that results in unacceptably slow simulation. By providing bit and cycle accurate behavior for the block, the HLMS enables the user to design at a high level of abstraction without losing control or visibility of the ultimate hardware realization.

It is desirable for an HLMS to include block libraries whose elements can be used to construct systems quickly. For example, an HLMS targeting digital signal processing (DSP) or digital communications applications could include blocks for finite impulse (FIR) and infinite impulse response (IIR) digital filters, fast Fourier transforms (FFTs), or error-correcting codecs. For high-level functions, there is often a significant amount of effort involved in creating an efficient implementation component. Providing a separate simulation model may provide a faster simulation model. However, constructing a separate bit and cycle accurate behavioral model for a complex IP block can be very time consuming.

For example, in the System Generator HLMS, a C++ simulation model may be created, including System Generator-specific data-types, classes, and interfaces, and used in simulating with the HLMS. Creating the C++ model for a complex IP block may require significant engineering resources.

The present invention may address one or more of the above issues.

SUMMARY OF THE INVENTION

The various embodiments of the invention derive a high-level, bit-accurate and cycle-accurate simulation model from a functional description of a module and an HDL description of the module. The functional description may be un-timed and specified in a high-level language. The HDL description is realizable in hardware. The simulation model is created by obtaining the control specification from the HDL description and combining the control specification with a data path description derived from the functional description.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings in which.

DETAILED DESCRIPTION

The various embodiments of the invention relate to developing a high-level simulation model that is bit-true and cycle-true for high-level simulation. By extracting control details from a low-level specification of the design, converting the control details to a high-level modeling language, and combining the result with a high-level description of the data path (functional description), a high-level simulation model may be easily developed for a circuit design. The control details taken from the low-level specification make the resulting high-level simulation model cycle-true, and the data path description makes the resulting high-level simulation model bit-true.

Figure 1:
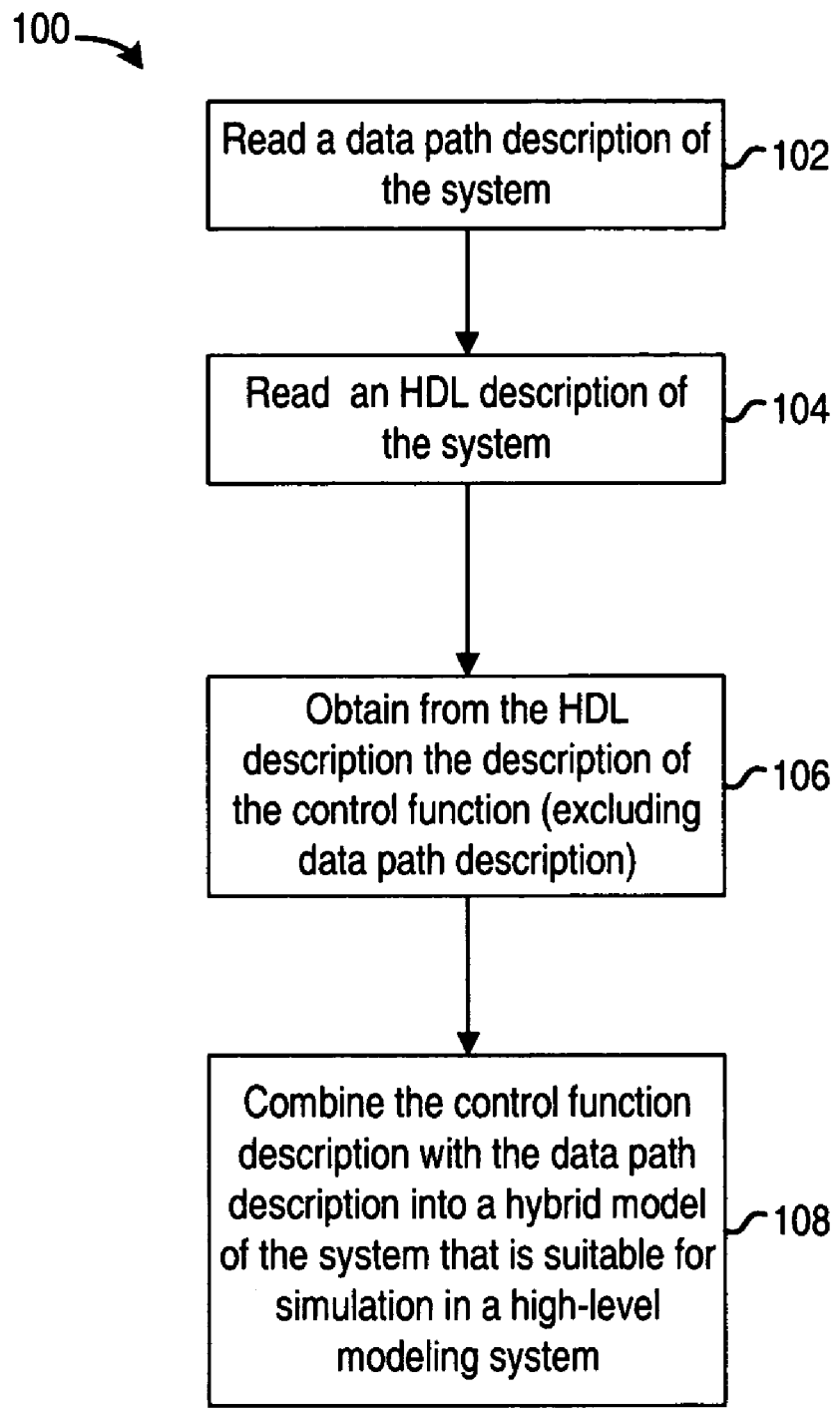
FIG. 1 is a flow diagram of a process for creating a simulation model in accordance with various embodiments of the invention.

FIG. 1 is a flow diagram of a process 100 for creating a simulation model in accordance with various embodiments of the invention. The process 100 creates the simulation model for a system by combining descriptions of the control logic and the data path that are specified in different languages.

At step 102, a description is read for a data path portion of a system. The data path description may be specified in a language for a high-level modeling system (HLMS). An HLMS description of the data path may be produced during algorithm development for the system. An HLMS description of the data path may be used for high-level modeling of alternative system designs to determine a system design that attains certain performance objectives.

The description of the data path may develop into a specification of the data path that accurately specifies the function performed by the data path without accurately modeling the system timing. Such a data path description may be characterized as bit-true, but not cycle-true.

At step 104, an HDL description is read for the system. The HDL description may be a detailed description that accurately specifies both the function and the timing of the system. Thus, the HDL description may be characterized as bit-true and cycle-true. The HDL description may be developed to specify an integrated circuit implementing the system design, for example, a PLD programmed with configuration data generated from the HDL description specifying a structural hierarchy based on PLD primitives, or an integrated circuit generated by synthesis and routing from the HDL description.

At step 106, a description of the control logic is obtained from the HDL description for the system. The control logic may be automatically or manually separated from the data path portion of the system. The description of the control logic may result from a conversion, which retains accurate timing modeling, from HDL to the language that is used by the data path description.

At step 108, the description of the control logic and the description of the data path are combined, to form a hybrid model of the system that is suitable for HLMS simulation. The accurately modeled system timing for the control logic combined with the accurately modeled function of the data path yields a hybrid simulation model that is both bit-true and cycle-true. The hybrid simulation model may improve the speed of simulation in the HLMS over a simulation of the HDL description in an HDL simulator.

Figure 2:
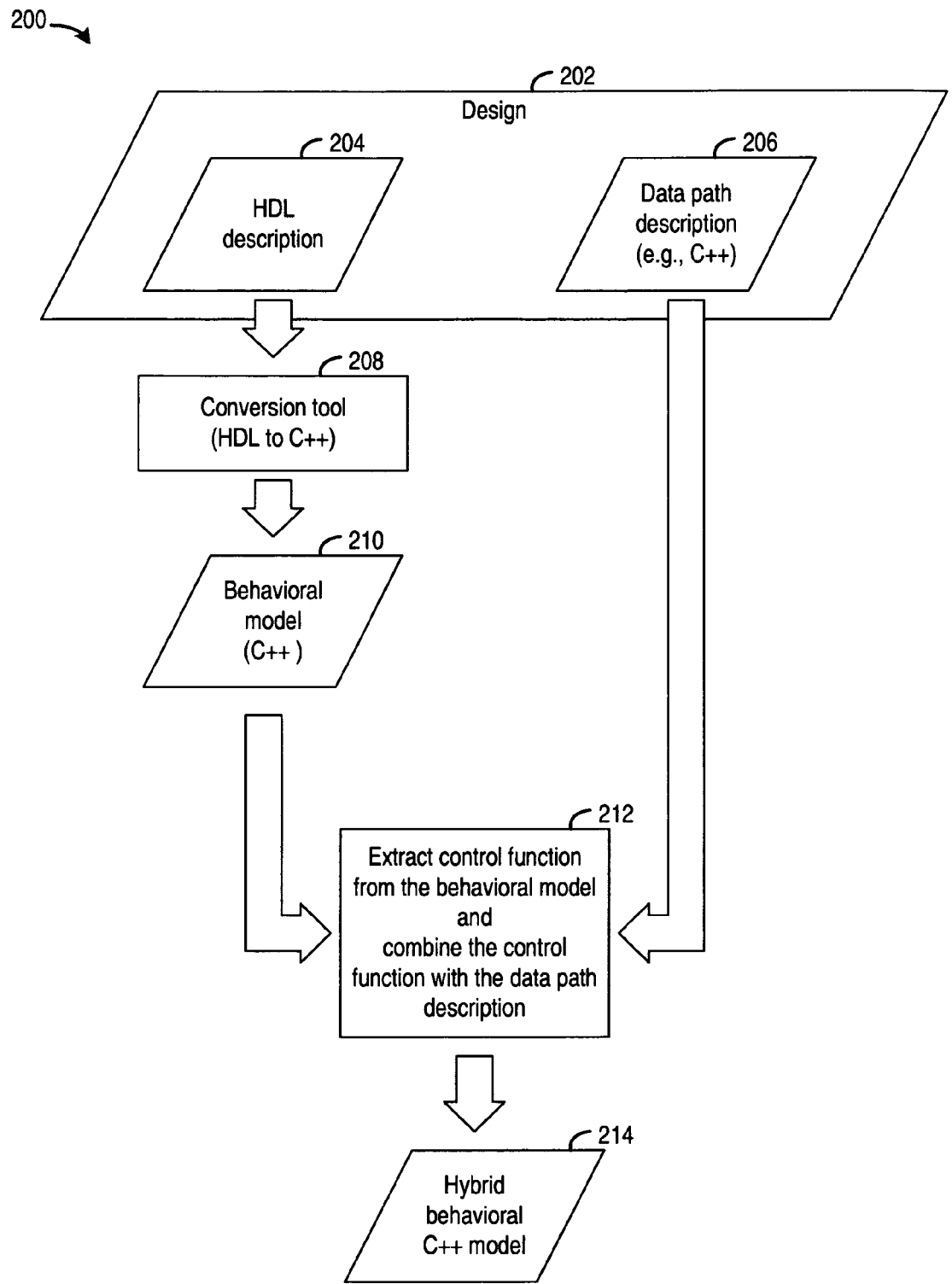
FIG. 2 is a data flow diagram for preparing a hybrid simulation model in accordance with various embodiments of the invention.

FIG. 2 is a data flow diagram 200 for preparing a hybrid simulation model 214 in accordance with various embodiments of the invention. Portions of descriptions 204 and 206 of design 202 are combined to form a hybrid simulation model 214. The data path description 206 may describe the design at a high level of abstraction and the HDL description 204 may describe the details of an implementation of the design.

A system design 202 may have a data path description 206 in an HLMS language, for example C++, and an HDL description 204 in, for example, VHDL or Verilog. The data path description 206 may be initially developed to evaluate various design implementations at a high level of abstraction, such that an implementation of the data path that attains certain performance objectives may be determined. Subsequently, the data path description 206 and the HDL description 204 may be developed in parallel with the high-level understanding acquired from the data path description 206 influencing the HDL description 204, and the low-level understanding acquired from the HDL description 204 influencing the data path description 206.

During co-development of descriptions 206 and 204 for design 202, the behavior of the data path description 206 may be compared with the behavior of the HDL description 204 to expose defects in either description 206 or 204. Near the completion of descriptions 206 and 204, the data path description 206 may provide a bit-true, but not cycle-true, specification of the system, while the HDL description 204 may provide a bit-true and cycle-true implementation of the system. At the completion of the descriptions 206 and 204 for design 202, descriptions 206 and 204 may specify a common design 202 at different levels of abstraction.

It will be appreciated that other processes may be used to develop the data path description 206 and the HDL description 204, depending on various factors, such as the procedures used by a development group or the availability of personnel with the appropriate skills.

A conversion tool 208, can be constructed using technology common to an HDL simulation tool such as ISIM from Xilinx, and may be used to convert the HDL description 204 to an equivalent (bit and cycle accurate) representation in a high-level language such as C++, encapsulated for customization and simulation in an HLMS system, such as System Generator, to produce the behavioral model 210. It will be appreciated that other high-level languages, such as MATLAB, Simulink, C, or Javascript, may be used depending on the target simulation environment. An example conversion tool 208 may be used to generate from the HDL description 204 a behavioral model 210 that may be used to simulate the behavior of the implementation of design 202 specified by HDL description 204. The speed of simulation for C++ behavioral model 210 may be slow due to the poor mapping of certain operations, such as data path operations, to software for a processor providing fixed and floating point operations. The poor mapping of data path operations may cause the data path operations to be the dominant factor limiting the simulation speed of behavioral model 210. The speed of simulation for behavioral model 210 may be slower than logic simulation of HDL description 204, despite the higher level of abstraction available for behavioral model 210.

The combination 212 of the data path description 206 and the control logic portion of the behavioral model 210 yields the hybrid behavioral model 214. The control function may consist of register transfer logic (RTL) that determines the timing behavior for design 202. The RTL of the control function and the data path description 206 may both map efficiently to software for a processor providing fixed and floating point operations. Combining the data path description 206 at a high level of abstraction with the control function for the behavioral model 210 may result in a hybrid model 214 having a simulation speed that is no longer dominated by the data path operations. Thus, the hybrid behavioral model 214 may have significantly faster simulation speed than either the behavioral model 210 or logic simulation of the HDL description 204. With timing behavior for design 202 provided by the control function of behavioral model 214, the C++ hybrid behavioral model 214 may be bit-true and cycle-true.

Various approaches may be used to extract the control function from the behavioral model 210. In one embodiment, the behavioral model 210 retains a structural hierarchy present in the HDL description 204, and the structural hierarchy contains blocks that provide either a control function or a data path function. Typically, a design 202 is specified in HDL description 204 with blocks that do not combine a control function and a data path, except at the top level of the structural hierarchy. The control function may be extracted by extracting blocks identified to provide a control function, for example, by user provided tags. In another embodiment, the signals corresponding to the inputs and outputs of data path description 206 are identified in behavioral model 210; these identified signals are severed in behavioral model 210; and finally, the unconnected functions are automatically removed from behavioral model 210, for example, by logic minimization tools that eliminate unconnected logic. The control function is manually separated from the behavioral model 210 in an alternative embodiment, for example, by preprocessing of conditional compilation flags that are user provided.

Figure 3:
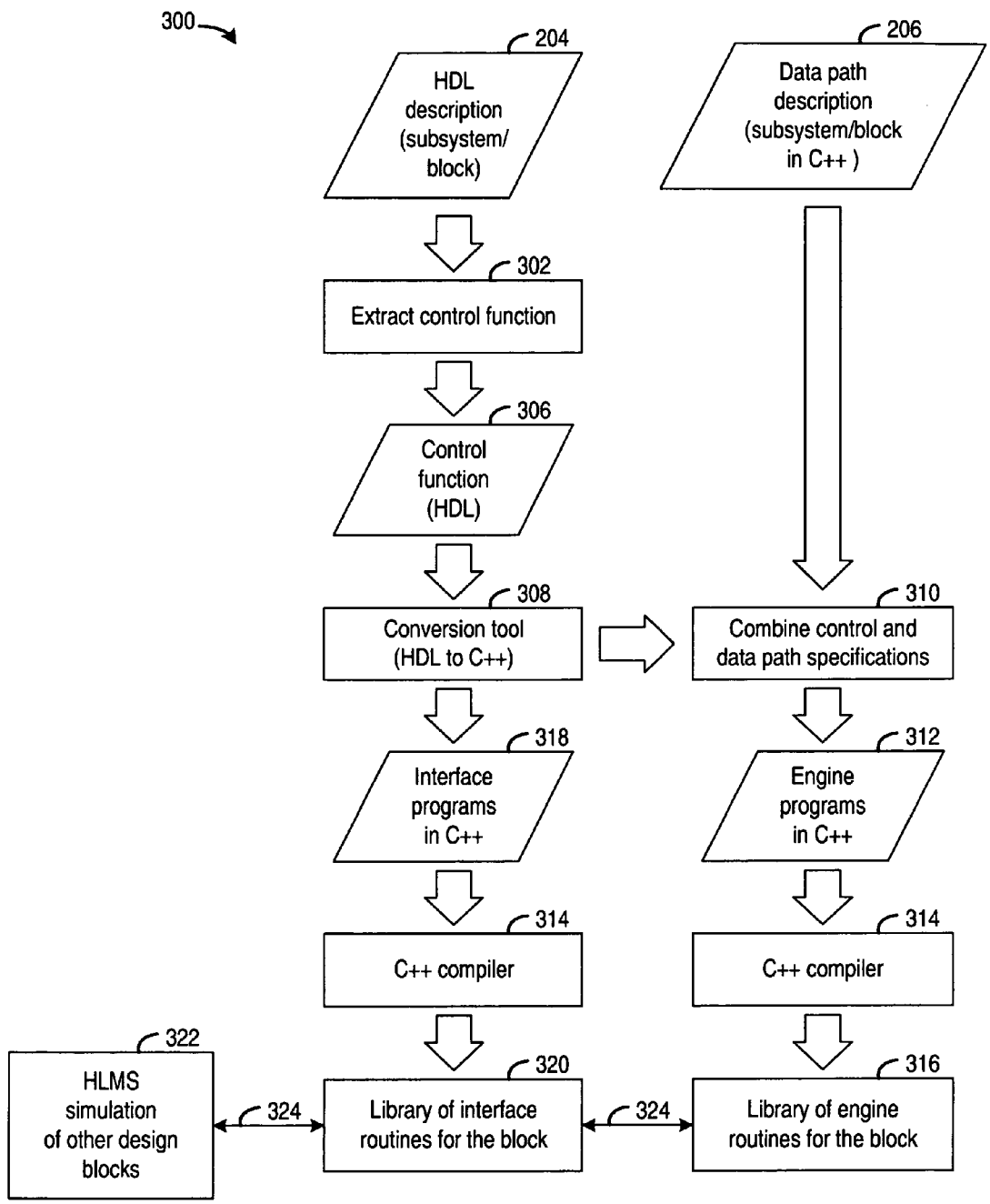
FIG. 3 is a data flow diagram for creating a simulation using a subsystem model in accordance with further embodiments of the invention.

FIG. 3 is a data flow diagram 300 for creating a simulation using a subsystem model in accordance with further embodiments of the invention. Two descriptions 204 and 206 for a subsystem are used to prepare the subsystem model used by an HLMS simulation of a system that includes the subsystem. The data path description 206 specifies the subsystem at a high level of abstraction, and the HDL description 204 specifies the details of an implementation of the subsystem. Typically, the subsystem is a particular block of the system. It will be appreciated that a system may include more than one subsystem each having a corresponding subsystem model prepared in accordance with various embodiments of the invention.

An HLMS, such as Matlab or System Generator for DSP from Xilinx, permits a user to create a system by graphically selecting blocks from a block library and graphically connecting the blocks. An HLMS further permits simulation of the system using a provided simulation model for each block. Making a block available in a block library requires providing a simulation model for the block to enable simulation of a system including the block. The simulation model for a block may need to be provided in a high level modeling language, such as C++, that is supported by the HLMS. One or more embodiments of the invention may generate a simulation model for a block from descriptions 206 and 204 to allow the block to be made available in a block library.

Extraction 302 of a control function from the HDL description 204 for the subsystem produces the control function HDL 306. In one embodiment, extraction 302 is performed before conversion 308, as shown. In another embodiment, extraction is performed after conversion, as previously discussed in connection with FIG. 2. Extraction 302 of the control function 306 may be performed, for example, by extracting the sub-blocks from the HDL description 204 that are identified as control sub-blocks. The control sub-blocks may be identified, for certain examples, as the sub-blocks containing at least one storage register.

Conversion tool 308 converts the control function HDL 306 into a high level modeling language. Combination 310 of the data path description 206 with a result of conversion 308 of the control function HDL 306 produces the engine programs 312. The engine programs 312 detail the function of the subsystem in a high level modeling language, such as C++. The engine programs 312 are compiled by a compiler 314 to generate executables that may be stored in a library 316 of engine routines for the subsystem. The executables stored in library 316 for the subsystem may be bit-true and cycle-true.

An engine routine from library 316 may be invoked by the HLMS with a data stream for each input parameter specifying a time sequence of values for each input of the subsystem. The engine routine may produce a data stream for each output parameter specifying a time sequence of the resulting values for each output of the subsystem. A particular engine routine may be invoked multiple times during a particular simulation if the system contains multiple instances of the subsystem.

Conversion tool 308 may additionally generate interface programs 318 from the control function HDL 306. The interlace programs 318 may perform conversion of data formats for the inputs and outputs of the subsystem during execution of the simulation. For example, an interface program may receive a data stream having a specified format for each input of the subsystem, and the interface program may convert each value of each data stream based on the corresponding stream format into an integer type expected by an engine routine from library 316.

Generally in an HLMS, each parameter may have a format that is context dependent. Because the simulation model for the subsystem is based on a specific implementation provided by descriptions 206 and 204, the simulation model for the subsystem may not support a context dependent format for the inputs and outputs of the subsystem. The interface programs 318 perform parameter conversion between a context dependent format and a predetermined format required by the subsystem simulation model.

The interface programs 318 are compiled by compiler 314 to produce interface routines that may be stored in library 320. Together, libraries 316 and 320 provide the routines that are added to a block library of an HLMS to make the block with descriptions 206 and 204 available to a user of the HLMS.

An HLMS simulation has a simulation model for the subsystem provided by libraries 316 and 320, and a collection of simulation models 322 for other blocks of the simulation. Lines 324 show the transfer of parameter data streams between the various models during execution of the simulation. Interface routines 320 are an intermediary for parameter data streams transferred between engine routines 316 and the simulation models 322 for the other blocks of the simulation.

During initialization of a simulation by a HLMS, the HLMS system may invoke the engine routines from library 316 with input and output parameters having a context dependent format. The engine routine in turn invokes interlace routines from library 320 to convert the format of input parameters before processing by the engine routine, and the engine routine additionally invokes interface routines from library 320 to convert the format of outputs generated by engine routine before returning the output parameters. The various libraries 316, 320, and 322 may be dynamically linked libraries.

Figure 4:
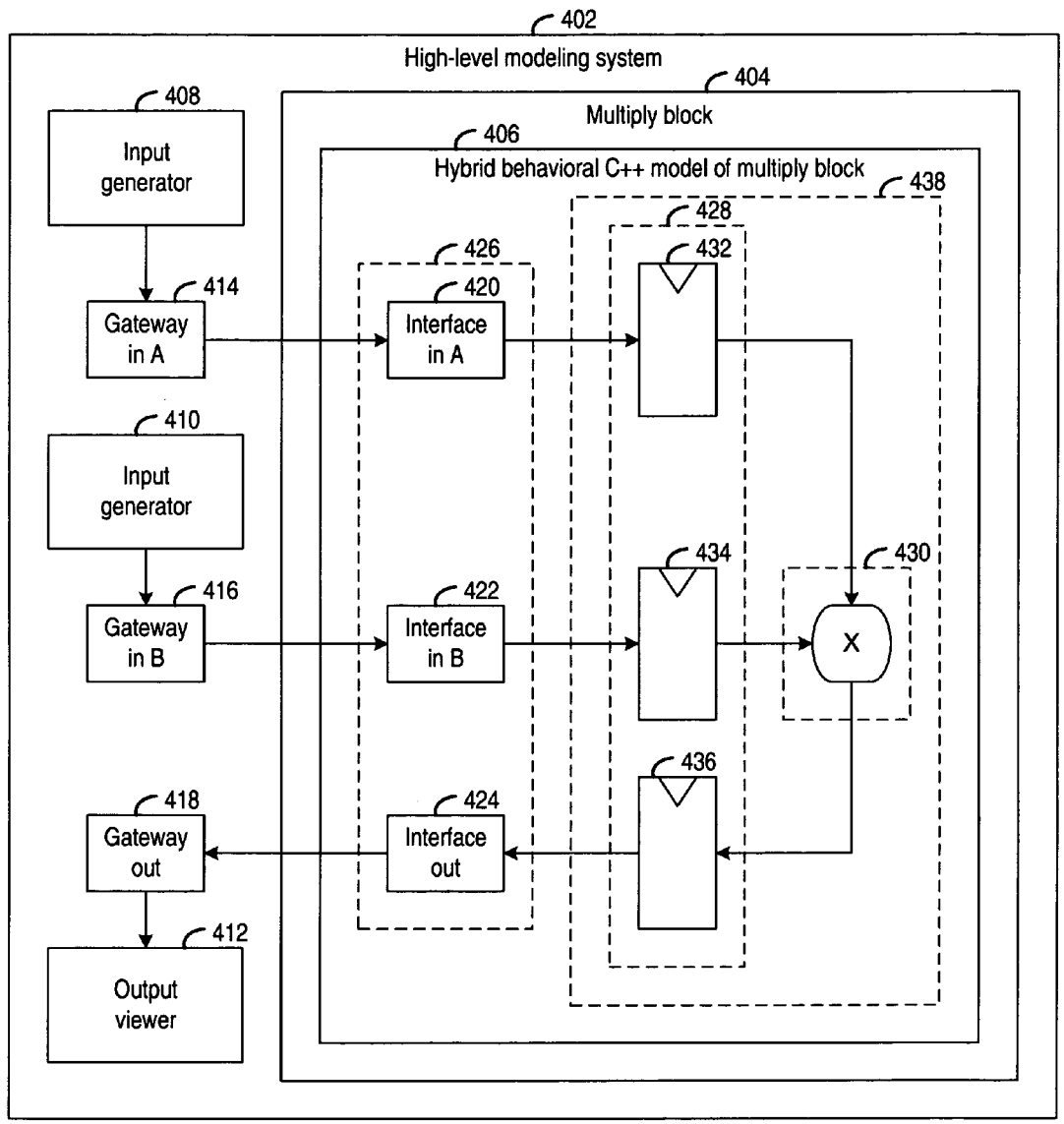
FIG. 4 is an example of a block diagram created in a high-level modeling system.

FIG. 4 is an example of a block diagram created in a high-level modeling system (HLMS) 402. A user of the HLMS 402 may graphically select and graphically connect the various components 404, 408, 410, 412, 414, 416, and 418 in the HLMS 402. The HLMS 402 may execute a simulation including a multiply block 404 using a hybrid simulation model 406 for the multiply block 404. The contents of the multiply block 404, including the hybrid simulation model 406, may be invisible to the user of the HLMS 402.

Input generators 408 and 410 may be used to generate the inputs for the multiply block 404, and output viewer 412 may be used to view the output from the multiply block 404. The HLMS 402 may provide a wide variety of possible input generators 408 and 410, for example, a linear ramp, a sinusoid, or pseudo-random noise, that may be selected by a user of the HLMS 402. Examples for output viewer 412 include an oscilloscope function or a value listing function.

By default, the HLMS 402 may represent data with double precision floating point values. A subsystem developed for implementation in a PLD typically represents data with fixed point values and requires fewer than the 64 bits of precision required to represent double precision floating point values. The gateway blocks 414, 416, and 418 may convert input and output data between the double precision floating point used by the HLMS 402 and a particular fixed point representation defined by the configuration of the individual gateway block 414, 416, and 418.

While a subsystem developed for implementation in a PLD may operate on fixed point values for inputs and outputs, an HDL description for the subsystem typically represents data values as bit vectors because a fixed point representation may not exist in the HDL. The interface programs 420, 422, and 424 internal to the hybrid simulation model 406 perform a further conversion for the inputs and outputs of the multiply block 404 between fixed point values and bit vector values, to be compatible with the representation of the corresponding HDL description. A library 426 of interface programs 420, 422, 424 is generated during the generation of the simulation model 406.

The hybrid simulation model 406 may include a control function 428 and a data path 430. The control function 428 specifies the timing behavior of simulation model 406 including the registers 432, 434, and 436. The control function 428 is generated from an HDL description of the multiply block 404 and the data path 430 is generated from a description in a high-level modeling language of the data path of the multiply block 404. A library 438 of engine routines 428 and 430 is generated during the generation of the simulation model 406.

An HDL description (corresponding to HDL description 204 in FIG. 3) for the multiply block 404 in VHDL is shown below. The specification of the "mult" data path in VHDL is omitted because the "mult" data path definition in VHDL may be ignored during the generation of the hybrid simulation model.

```
entity multiplyblock is
    port(
        a   : in std_logic_vector(7 downto 0);
        b   : in std_logic_vector(7 downto 0);
        clk : in std_logic;
        res : out std_logic_vector(15 downto 0)
    );
end multiplyblock;
architecture behavior of multiplyblock is
signal a_dly, b_dly : std_logic_vector(7 downto 0);
signal result : std_logic_vector(15 downto 0);
begin
    a_delay : register
        generic map (width => 8)
        port map (
            clk => clk,
            din => a,
            dout => a_dly
        );
    b_delay : register
        generic map (width => 8)
        port map (
            clk => clk,
            din => b,
            dout => b_dly
        );
    mult_inst : mult
        port map (
            a => a_dly,
            b => b_dly,
            res => result
        );
    res_delay : register
        generic map (width => 16)
        port map (
            clk => clk,
            din=> result,
            dout=> res
        );
end behavior;
```

The control function (corresponding to control function 306 in FIG. 3) specifies the timing behavior for "multiplyblock" above with the three register instances and associated signal connections. The control function is extracted by extracting the three register instances with associated signals and omitting the "mult" data path instance. The conversion tool converts the VHDL for the multiply block 404 into C++ by first generating a function, shown below, to define the signals in a C++ simulation model with data structures TB, Tk, Ts, Ty, TH, TN, and TU.

```
timing_model::timing_model(const char *name,
    const char* ArchName, const char* fileName,
    const char * vin_width, const char * vOut_width):
    EntyBlk(false,name, "timing_model", ArchName,
fileName),
    TB( ), Tk( ), Ts( ), Ty( ),TH( ), TN( ), TU( )
{
    new(&TB) Signal("clk",
        &IeeeStd_logic_1164->Std_logic, this,
        Sim::PortSigIn);
    TB.setDefaultValue((char *)0);
    new(&Tk) Signal("a",
        &IeeeStd_logic_1164->Std_logic_vector,
        MKConstr(7, 0, Sim::DOWNTO), this,
        Sim::PortSigIn, (const char*)0);
    Tk.setDefaultValue((char *)0);
    new(&Ts) Signal("b",
        &IeeeStd_logic_1164->Std_logic_vector,
        MKConstr(7, 0, Sim::DOWNTO), this,
        Sim::PortSigIn, (const char*)0);
    Ts.setDefaultValue((char *)0);
```
-continued
```
    new(&Ty) Signal("res",
        &IeeeStd_logic_1164->Stdlogic_vector,
        MKConstr(15, 0, Sim::DOWNTO), this,
        Sim::PortSigIn, (const char*)0);
    Ty.setDefaultValue((char *)0);
    new(&TH) Signal("a_dly",
        &IeeeStd_logic_1164->Std_logic_vector,
        MKConstr(7, 0, Sim::DOWNTO), this,
        Sim::PortSigOut, (const char*)0);
    TH.setDefaultValue((char *)0);
    new(&TN) Signal("b_dly",
        &IeeeStd_logic_1164->Std_logic_vector,
        MKConstr(7, 0, Sim::DOWNTO), this,
        Sim::PortSigOut, (const char*)0);
    TN.setDefaultValue((char *)0);
    new(&TU) Signal("result",
        &IeeeStd_logic_1164->Std_logic_vector,
        MKConstr(15, 0, Sim::DOWNTO), this,
        Sim::PortSigOut, (const char*)0);
    TU.setDefaultValue((char *)0);
    SetPorts( );
}
```

The conversion tool converts the VHDL for the multiply block 404 into C++ by also generating a function, shown below, to instantiate the three registers in the C++ simulation model with signal connections provided by data structures TB, Tk, Ts, Ty, TH, TN, and TU.

```
void timing_behavior::archImplement(ConfigDecl* cfg) {
    {
        int vC9 = (*(int *)Db Value);
        int *pC9 = &vC9;
        EntyBlk* INST= cfg->instantiate(this, "a_delay",
            "register", (InstFactoryPtr)IF1, 1, pC9);
        cfg->connectSig(this, INST, (PortMapPtr)PM1, 3,
            "din", &Tk, "clk", (&TB), "dout", &TH);
    }
    {
        int vC9 = (*(int *)Db.Value);
        int *pC9 = &vC9;
        EntyBlk* INST= cfg->instantiate(this, "b_delay",
            "register", (InstFactoryPtr)IF1, 1, pC9);
        cfg->connectSig(this, INST, (PortMapPtr)PM1, 3,
            "din", &Ts, "clk", (&TB), "dout", &TN);
    }
    {
        int vC9 = (*(int *)De.Value);
        int *pC9 = &vC9;
        EntyBlk* INST=cfg->instantiate(this, "res_delay",
    "register", (InstFactoryPtr)IF1, 1, pC9);
        cfg->connectSig(this, INST, (PortMapPtr)PM1, 3,
            "din", &Ty, "clk", (&TB), "dout", &TU);
    }
}
```

In addition, the conversion tool makes available previously generated interface functions to convert between the known format for the inputs and outputs of the multiply block 404 provided by the VHDL description and the context dependent format for the inputs and outputs of the multiply block 404 in the HLMS 402.

The C++ simulation model is produced by combining the control function generated by the conversion tool with a data path description that is shown below for the multiply data path 430, which corresponds to data path description 206 in FIG. 3.

```
unsigned short mult(unsigned char a, unsigned char b) {
return (unsigned short) a * (unsigned short) b;
}
```

Those skilled in the art will appreciate that various alternative computing arrangements would be suitable for hosting the processes of the different embodiments of the present invention. In addition, the processes may be provided via a variety of computer-readable media or delivery channels such as magnetic or optical disks or tapes, electronic storage devices, or as application services over a network.

The present invention is believed to be applicable to a variety of systems for simulating electronic circuit designs and has been found to be particularly applicable and beneficial in constructing a high-level simulation model from high-level and low-level specifications of a design. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A processor-implemented method for generating a hybrid simulation model for a design block in an electronic system, comprising:
    reading a first high-level modeling language description of a data path function, wherein the first high-level modeling language description of the data path function is without a control function that provides a cycle-accurate simulation of the data path function;
    reading a hardware description language (HDL) specification of the design block, wherein the HDL specification of the design block includes an HDL description of the control function and an HDL description of the data path function;
    converting the HDL specification of the design block to a high-level modeling language description of the design block, wherein the high-level modeling language description of the design block includes a second high-level modeling language description of the data path function and a high-level modeling language description of the control function;
    determining the high-level modeling language description of the control function from the high-level modeling language description of the design block, wherein the description of the control function specifies cycle-accurate behavior of the design block without reference to functions in the design block that transform data; and
    combining the high-level modeling language description of the control function in the high-level modeling language with the first high-level modeling language description of the data path function into a bit-true and cycle-accurate hybrid simulation model in the high-level modeling language, wherein the first high-level modeling language description of the data path function is a bit-true specification of functions of the design block that transform data.

2. The method of claim 1, further comprising:
    compiling the hybrid simulation model in the high-level modeling language into at least one object file; and
    wherein the step of combining includes linking the at least one object file to at least one other object file that is a simulation model of another design block.

3. The method of claim 2, wherein the linking step is performed at initialization of simulation execution using dynamically linked libraries.

4. The method of claim 1, wherein the determining the description of the control function from the high-level modeling language description includes searching for tags in the high-level modeling language description indicative of the control function.

5. The method of claim 4, further comprising:
    identifying input signals and output signals in the first high-level modeling language data path description;
    removing the identified input and output signals from the high-level modeling language description of the design block; and
    removing unconnected functions from the high-level modeling language description of the design block.

6. The method of claim 1, further comprising generating one or more interface programs from the HDL specification of the design block, each interface program configured to convert a data format for one of input to and output from the design block during simulation.

7. The method of claim 1, wherein the high-level modeling language is C++.

8. The method of claim 1, wherein the high-level modeling language is C.

9. The method of claim 1, wherein the high-level modeling language is MATLAB.

10. The method of claim 1, wherein the high-level modeling language is Simulink.

11. The method of claim 1, wherein the high-level modeling language is Javascript.

12. The method of claim 1, wherein the HDL is VHDL.

13. The method of claim 1, wherein the HDL is Verilog.

14. An apparatus for generating a hybrid simulation model for a design block in an electronic system, comprising:
    means for reading a first high-level modeling language description of a data path function, wherein the first high-level modeling language description of the data path function is without a control function that provides a cycle-accurate simulation of the data path function;
    means for reading a hardware description language (HDL) specification of the design block, wherein the HDL specification of the design block includes an HDL description of the control function and an HDL description of the data path function;
    means for converting the HDL specification of the design block to a high-level modeling language description of the design block, wherein the high-level modeling language description of the design block includes a second high-level modeling language description of the data path function and a high-level modeling language description of the control function;
    means for determining the high-level modeling language description of the control function from the high-level modeling language description of the design block, wherein the description of the control function specifies cycle-accurate behavior of the design block without reference to functions in the design block that transform data;
    means for combining the high-level modeling language description of the control function in the high-level modeling language with the first high-level modeling language description of the data path function into a bit-true and cycle-accurate hybrid simulation model in the high-level modeling language, wherein the first high-level modeling language description of the data path function is a bit-true specification of functions of the design block that transform data.

* * * * *